(12) United States Patent  
Nitawaki et al.

(10) Patent No.: US 7,931,314 B2  
(45) Date of Patent: *Apr. 26, 2011

(54) VEHICLE DOOR OUTER HANDLE SYSTEM

(75) Inventors: Masakatsu Nitawaki, Miyazaki (JP); Hiroto Fujiwara, Miyazaki (JP); Osamu Hidaka, Miyazaki (JP); Yuho Otsuta, Miyazaki (JP); Masahiko Sueyoshi, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 366 days.

This patent is subject to a terminal disclaimer.

(21) Appl. No.: 10/559,795

(22) PCT Filed: Jun. 18, 2004

(86) PCT No.: PCT/JP2004/008920
§ 371 (c)(1),
(2), (4) Date: Dec. 8, 2005

(87) PCT Pub. No.: WO2004/113652
PCT Pub. Date: Dec. 29, 2004

(65) Prior Publication Data
US 2007/0091627 A1   Apr. 26, 2007

(30) Foreign Application Priority Data

Jun. 20, 2003   (JP) .................................. 2003-176015
Sep. 26, 2003   (JP) .................................. 2003-335432

(51) Int. Cl.
*E05B 3/00* (2006.01)
*H03K 17/00* (2006.01)

(52) U.S. Cl. ............... 292/336.3; 292/92; 292/DIG. 65; 340/5.72

(58) Field of Classification Search ............... 292/336.3; 340/5.62, 5.71
See application file for complete search history.

(56) References Cited

U.S. PATENT DOCUMENTS

| 5,304,967 | A  | * | 4/1994 | Hayashi ........................ 333/206 |
| 6,075,294 | A  | * | 6/2000 | Van den Boom et al. ... 307/10.1 |
| 6,740,834 | B2 | * | 5/2004 | Sueyoshi et al. ............. 200/600 |
| 6,769,154 | B1 | * | 8/2004 | Klein et al. ...................... 16/412 |
| 6,883,840 | B2 | * | 4/2005 | Sueyoshi et al. ............ 292/336.3 |
| 7,199,317 | B2 | * | 4/2007 | Ieda et al. ................... 200/61.62 |
| 7,217,899 | B2 | * | 5/2007 | Hidaka et al. ................ 200/600 |
| 7,300,190 | B2 | * | 11/2007 | Nitawaki et al. .............. 362/501 |
| 2003/0107473 | A1 | * | 6/2003 | Pang et al. ..................... 340/5.72 |

FOREIGN PATENT DOCUMENTS

| JP | 62-100919 | 5/1987 |
| JP | 62-57228 B2 | 11/1987 |
| JP | 2-44279 Y2 | 11/1990 |
| JP | 2002-57564 A | 2/2002 |
| JP | 2002-295093 A | 10/2002 |
| JP | 2003-161064 A | 6/2003 |
| JP | 2003-221949 A | 8/2003 |
| JP | 3619505 | 11/2004 |
| WO | WO 03/030365 A1 | 4/2003 |

* cited by examiner

*Primary Examiner* — Carlos Lugo
(74) *Attorney, Agent, or Firm* — Arent Fox LLP

(57) ABSTRACT

A vehicle door outer handle system is provided in which a pair of electrodes and a circuit board on which is provided a detection circuit for detecting a change in capacitance between the electrodes are housed within an operating handle formed from a handle main body and a cover covering the outer side of the handle main body, the operating handle being disposed on an outer side of a vehicle door, and the electrodes (43) being patterned on the circuit board (44), the operating handle thereby being made thin.

6 Claims, 8 Drawing Sheets

VEHICLE DOOR OUTER HANDLE SYSTEM

CROSS-REFERENCE TO RELATED APPLICATION

This application is a National Stage entry of International Application No. PCT/JP2004/008920, filed Jun. 18, 2004, the entire specification claims and drawings of which are incorporated herewith by reference.

FIELD OF THE INVENTION

The present invention relates to a vehicle door outer handle system that enables a vehicle user's intention to unlock to be confirmed by means of a change in capacitance when the vehicle user's hand approaches or touches an operating handle and, in particular, to a vehicle door outer handle system that includes an operating handle formed from a handle main body made of a synthetic resin and a cover made of a synthetic resin so as to cover the outer side of the handle main body, the operating handle being disposed on an outer side of a vehicle door and housing therewithin a pair of electrodes and a circuit board on which is provided a detection circuit for detecting a change in capacitance between the electrodes.

BACKGROUND ART

Conventionally, with regard to an arrangement for confirming a vehicle user's intention to unlock a door, for example, one disclosed by Japanese Patent Application Laid-open No. 2003-221949 is known, in which a capacitance sensor is disposed within an operating handle, and a vehicle user's intention to unlock a door is confirmed by means of a change in capacitance when the vehicle user's hand approaches or touches the operating handle.

However, in this conventional arrangement, since electrodes formed as members that are separate from a circuit board are connected to a detection circuit provided on the circuit board, it is necessary to ensure that there is a space for arranging the electrodes within the operating handle in addition to a space for housing the circuit board, the space that has to be reserved within the operating handle is relatively large, and it is difficult to make a thin operating handle.

DISCLOSURE OF THE INVENTION

The present invention has been accomplished under the above-mentioned circumstances, and it is an object thereof to provide a vehicle door outer handle system that enables an operating handle to be made thin.

In accordance with a first aspect of the present invention, there is provided a vehicle door outer handle system comprising: an operating handle comprising a handle main body made of a synthetic resin and a cover made of a synthetic resin so as to cover the outer side of the handle main body, the operating handle being disposed on an outer side of a vehicle door; a pair of electrodes; and a circuit board on which is provided a detection circuit for detecting a change in capacitance between the electrodes, the electrodes and the circuit board being housed within the operating handle; characterized in that the electrodes are patterned on the circuit board. In accordance with the first aspect, since the electrodes are patterned on the circuit board, it is unnecessary to ensure that there is a space for arranging the electrodes separately from the circuit board, thereby enabling the operating handle to be made thin.

In accordance with a second aspect of the present invention, in addition to the first aspect, among opposite faces of the circuit board, a component of the detection circuit is mounted on the face on the side opposite to the face where the electrodes are patterned. In accordance with the second aspect, the operating handle can be made yet thinner.

In accordance with a third aspect of the present invention, in addition to the first or second aspect, among opposite faces of the circuit board, the electrodes are patterned on the face on the vehicle side. In accordance with the third aspect, it is possible to reliably detect the vehicle user's hand touching the face of the operating handle on the vehicle side when the vehicle user grasps the operating handle.

In accordance with a fourth aspect of the present invention, in addition to the first aspect, a sensor unit comprising the electrodes, the circuit board, and a covering portion made of a synthetic resin and covering the electrodes and the circuit board is fixedly housed in a housing recess formed in the handle main body so as to open on the cover side. In accordance with the fourth aspect, the circuit board on which the detection circuit is provided and the pair of electrodes can be easily assembled within the operating handle, and the water resistance of the circuit board and the electrodes can be improved.

In accordance with a fifth aspect of the present invention, in addition to the fourth aspect, the electrodes and the circuit board are mounted on a holder, a majority of the holder being covered by the covering portion so as to form a part of the sensor unit. In accordance with the fifth aspect, when the covering portion is die-molded so as to cover the electrodes and the circuit board, it is possible to position and support the electrodes and the circuit board with the holder, and thus easily die-mold the covering portion.

In accordance with a sixth aspect of the present invention, in addition to the fifth aspect, a ground plate forming a part of the sensor unit is mounted on the holder so as to cover the electrodes and is covered by the covering portion. In accordance with the sixth aspect, it is possible to easily incorporate the ground plate in the sensor unit, thereby enhancing the ease of assembly of the ground plate to the handle main body.

In accordance with a seventh aspect of the present invention, in addition to the fifth or sixth aspect, a portion of the holder projecting from the covering portion is mounted on a mounting seat provided on the handle main body. In accordance with the seventh aspect, since the holder is mounted at a predetermined position of the handle main body, it is possible to easily set the positions of the electrodes within the operating handle by mounting the electrodes on the holder.

BRIEF DESCRIPTION OF THE DRAWINGS

FIG. 1 is a side view of a part of a vehicle door,
FIG. 2 is a sectional view along line 2-2 in FIG. 1,
FIG. 3 is a sectional view along line 3-3 in FIG. 1,
FIG. 4 is an enlarged view of part 4 of FIG. 2,
FIG. 5 is an enlarged view of part 5 of FIG. 2,
FIG. 6 is an exploded perspective view of a holder, a circuit board, and a ground plate,
FIG. 7 is a view from arrow 7 in FIG. 6,
and
FIG. 8 is a vertical sectional view of a die for molding a covering portion of a sensor unit, with the die opened.

BEST MODE FOR CARRYING OUT THE INVENTION

A mode for carrying out the present invention is explained below by reference to one embodiment of the present invention shown in the attached drawings.

Figure 1:
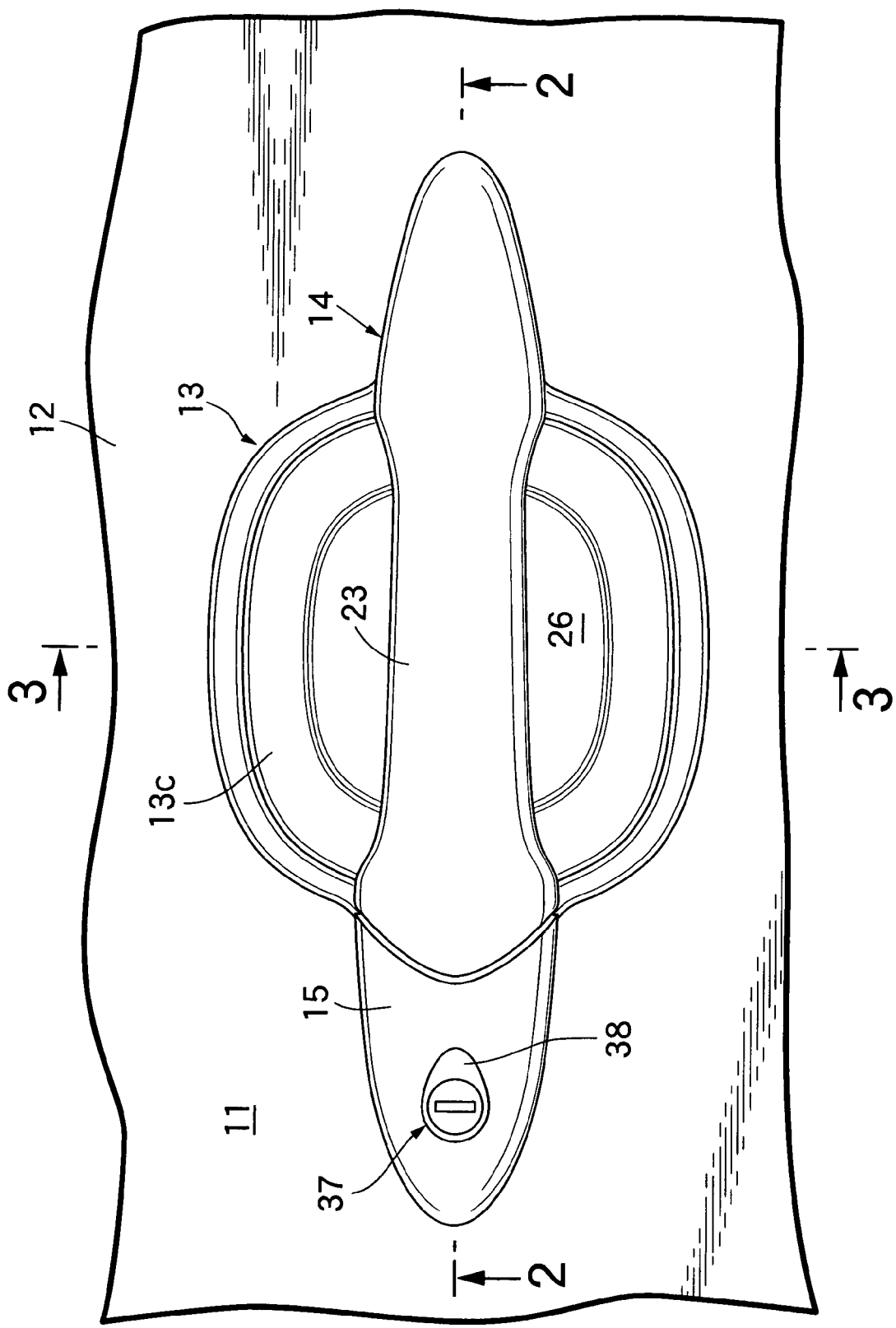
FIG. 1 to FIG. 8 show one embodiment of the present invention.
Figure 2:
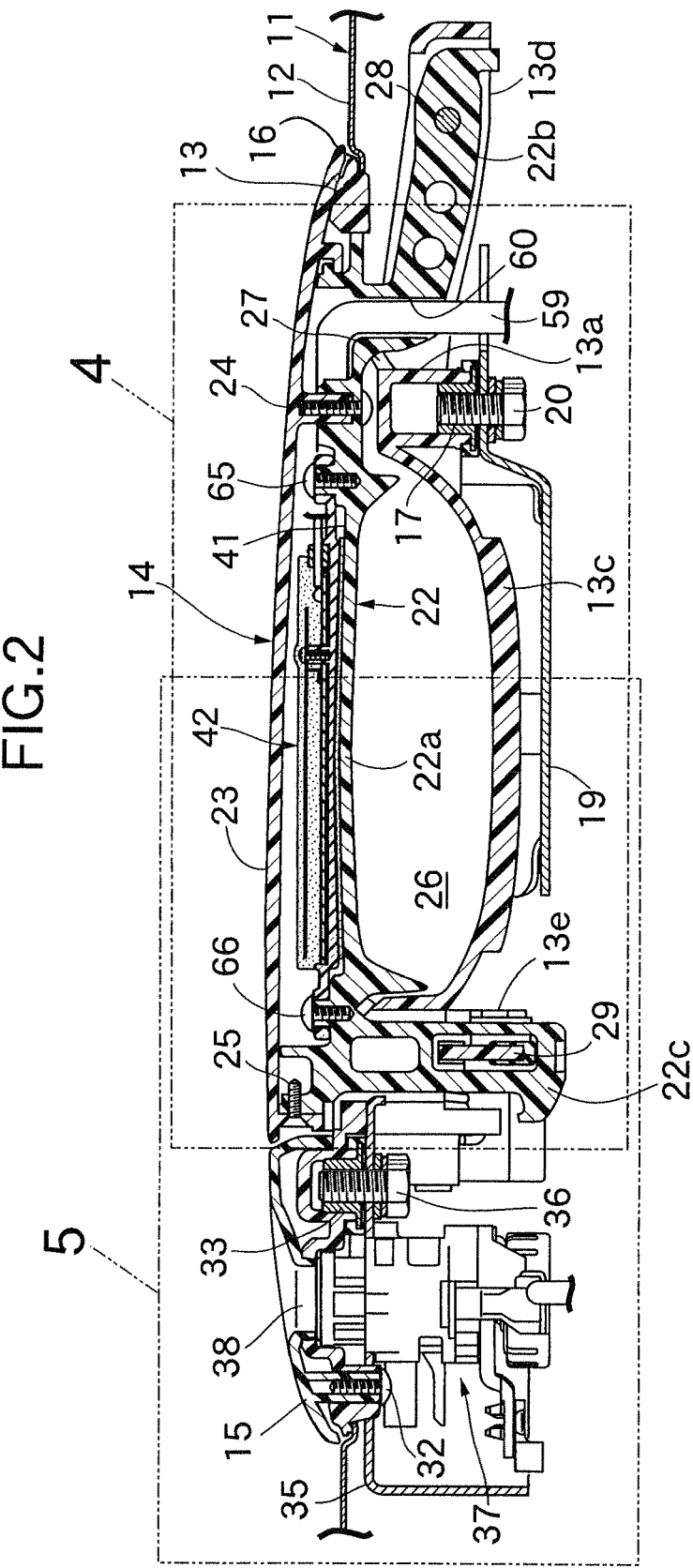
Figure 3:
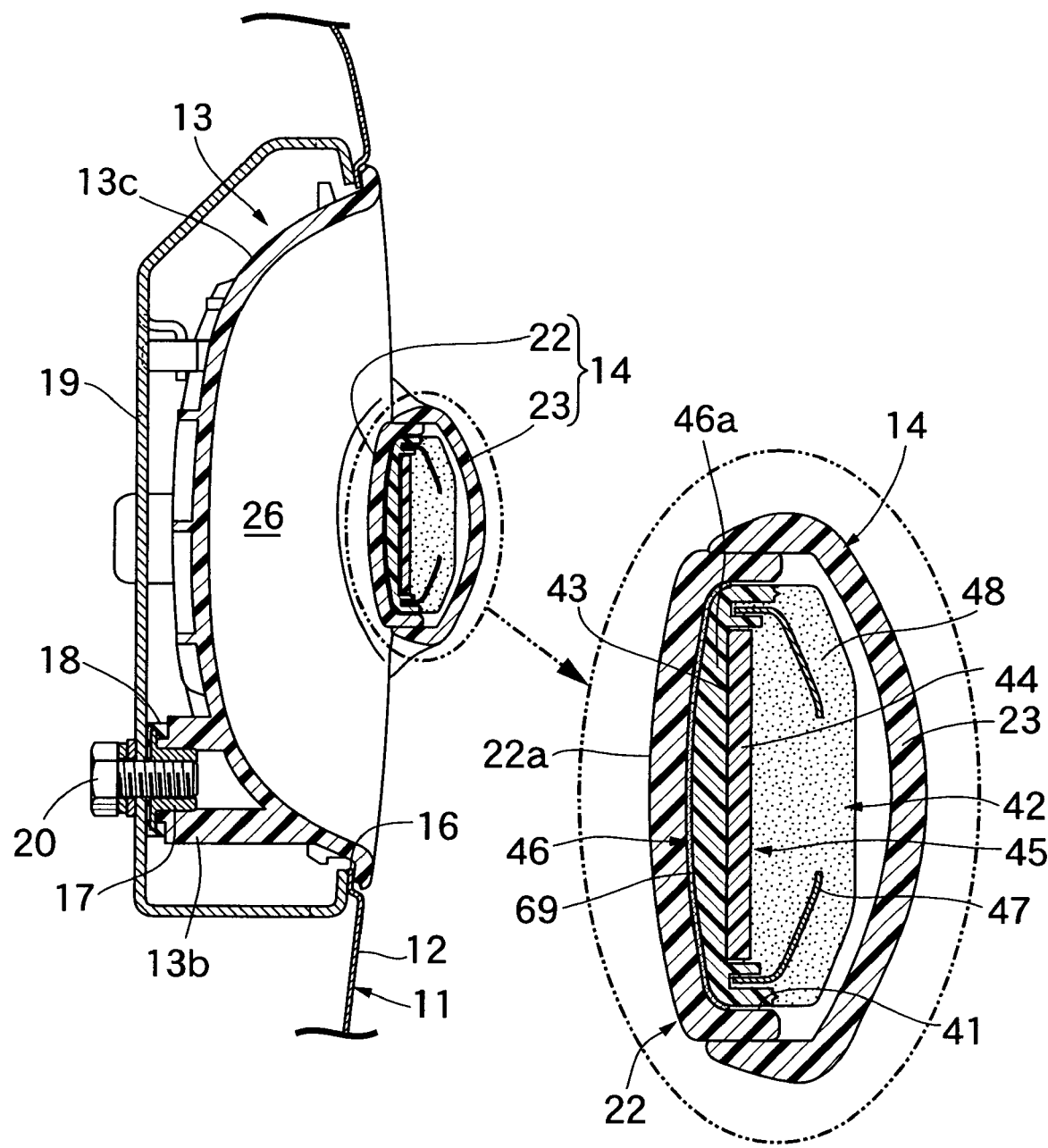

Referring firstly to FIG. 1 to FIG. 3, an outer panel 12 of a vehicle door 11, which is, for example, a side door of a passenger vehicle, is equipped with an outer handle system, and this outer handle system includes a handle case 13 mounted on the outer panel 12, an operating handle 14 extending in the fore-and-aft direction of the vehicle (the left and right direction in FIG. 1 and FIG. 2) and having one end, in the longitudinal direction, pivotably supported by the handle case 13, and a base member 15 mounted on the handle case 13 at the one end of the operating handle 14.

Figure 4:
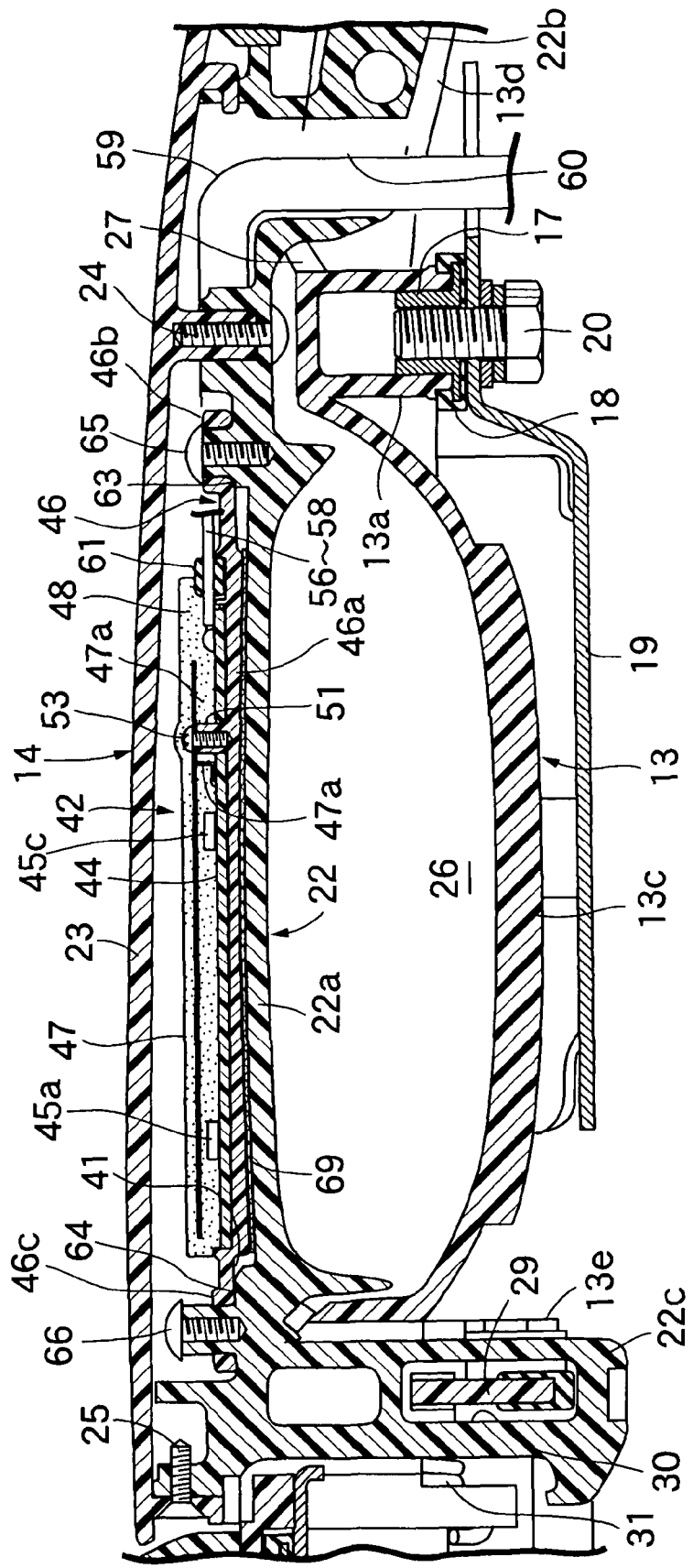
Figure 5:
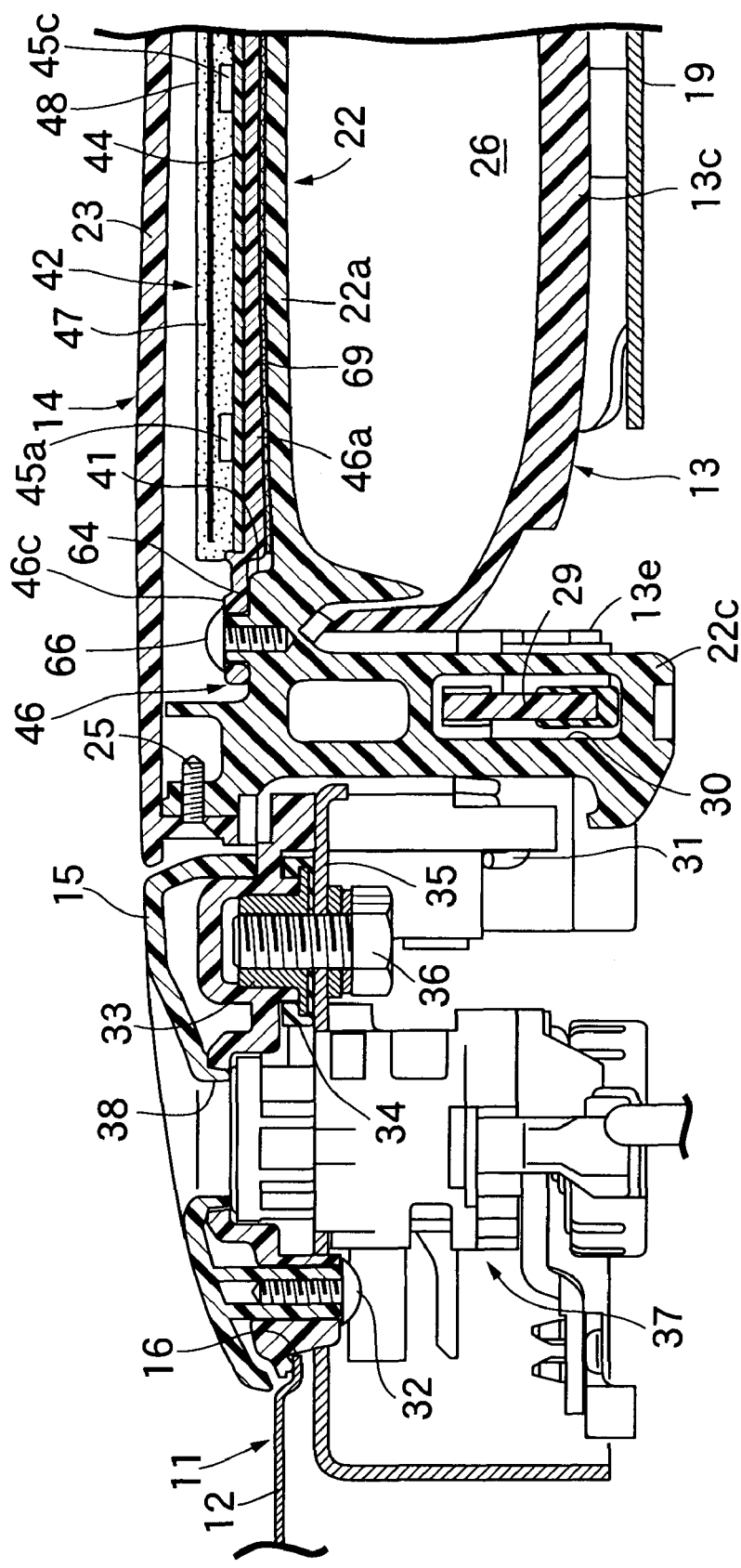

Referring in addition to FIG. 4 and FIG. 5, the outer panel 12 is provided with an aperture 16. A peripheral edge of the handle case 13, which is made of a synthetic resin so as to block the aperture 16, abuts against an outer face of the outer panel 12 along the whole of the peripheral edge of the aperture 16. Moreover, integrally provided at a plurality of, for example, two positions on the reverse side of the handle case 13 are cylindrical boss portions 13a and 13b, to which nuts 17 are mold-bonded. A metal protective cover 19 abutting against the nuts 17 via cap-shaped seat members 18 attached to the nuts 17 is mounted on the reverse side of the handle case 13 by screwing and tightening, into the nuts 17, bolts 20 inserted through the protective cover 19. Moreover, the protective cover 19 abuts against a reverse face of the outer panel 12 in parts of the peripheral edge of the aperture 16, and the handle case 13 is mounted on the outer panel 12 so as to sandwich the outer panel 12 between the handle case 13 and the protective cover 19.

The operating handle 14 is formed by tightening together, by means of a plurality of, for example, a pair of screw members 24 and 25, a handle main body 22 that is made of a rigid synthetic resin and extends in the fore-and-aft direction of the vehicle, and a cover 23 that is made of a synthetic resin and covers the outside of the handle main body 22.

The handle main body 22 integrally includes a grip portion 22a, a support arm portion 22b, and a guide arm portion 22c. The grip portion 22a has a substantially U-shaped cross section opening toward the outside of the outer panel 12 and extends in the fore-and-aft direction of the vehicle. The support arm portion 22b is integrally provided at one end of the grip portion 22a and has a substantially L-shaped form. The guide arm portion 22c is integrally provided at the other end of the grip portion 22a. The cover 23 is formed so as to extend in the fore-and-aft direction of the vehicle and to have a substantially U-shaped cross section opening toward the handle main body 22 so that the grip portion 22a of the handle main body 22 is fitted into the cover 23.

Provided in the handle case 13 is a curved portion 13c that protrudes inwardly relative to the outer panel 12 in order to form a recess 26 for allowing a vehicle user's hand to be inserted between the grip portion 22a of the handle main body 22 and the handle case 13. Also provided in the handle case 13 forward of the curved portion 13c (to the right in FIG. 2 and FIG. 4) are an insertion hole 27 into which the support arm portion 22b of the handle main body 22 is inserted, and an integral handle support portion 13d that holds, from opposite sides, the support arm portion 22b, which is inserted inside the outer panel 12 through the insertion hole 27. The support arm portion 22b is pivotably supported by the handle support portion 13d via a support pin 28. Said one end of the operating handle 14 is thereby pivotably supported in the handle case 13.

Integrally provided with the handle case 13 to the rear of the curved portion 13c (to the left in FIG. 2 and FIG. 5) is a guide tube portion 13e extending inwardly of the outer panel 12. The guide arm portion 22c on said other end of the handle main body 22 is movably inserted into the guide tube portion 13e. A bellcrank 29 is pivotably supported on the guide tube portion 13e so that it can pivot around an axis orthogonal to the pivot axis of the operating handle 14, that is, the axis of the support pin 28. One end of the bellcrank 29 engages with an engagement hole 30 provided in the guide tube portion 13e. That is, the operating handle 14 is coupled to the bellcrank 29.

A torsion spring 31 is provided between the bellcrank 29 and the guide tube portion 13a. The bellcrank 29 is biased by the spring force of the torsion spring 31 in a direction in which the guide arm portion 22c, which engages with the bellcrank 29, is pushed in a direction inwardly of the outer panel 12.

The base member 15, which is made of a synthetic resin, is mounted on the handle case 13 via a screw member 32 so as to cover a portion, to the rear of the guide tube portion 13e, of the handle case 13, and is formed at said other end of the operating handle 14 so that, when the operating handle 14 is in a non-operated state a smoothly connecting shape is made with a slight gap and there is an agreeable appearance.

A cylindrical nut 33 is mold-bonded to a portion of the handle case 13 covered by the base member 15, and a metal support plate 35 is mounted on the handle case 13 by screwing and tightening into the nut 33 a bolt 36 inserted through the support plate 35 with a cap-shaped seat member 34 attached to the nut 33 disposed between the support plate 35 and the nut 33. The support plate 35 supports a cylinder lock 37, and the cylinder lock 37 is mounted on the handle case 13 so that one end thereof faces a key insertion hole 38 provided in the base member 15.

The other end of the bellcrank 29 is coupled to a latch mechanism (not illustrated); when the cylinder lock 37 is in an unlocked state, if the operating handle 14 is not being operated the bellcrank 29 is in the non-operated position shown in FIGS. 2 and 5, and at this time the latch mechanism maintains the vehicle door 11 in a closed state. When the bellcrank 29 pivots from the position of FIG. 5 to an actuated position as a result of actuation of the guide arm portion 22c due to operation of the operating handle 14, the latch mechanism releases the closed state of the vehicle door 11, thereby enabling the vehicle door 11 to be opened by operation of the operating handle 14.

A rectangular housing recess 41 is formed in the handle main body 22 of the operating handle 14 so as to open on the cover 23 side, and a sensor unit 42 is fixedly housed in the housing recess 41.

Figure 6:
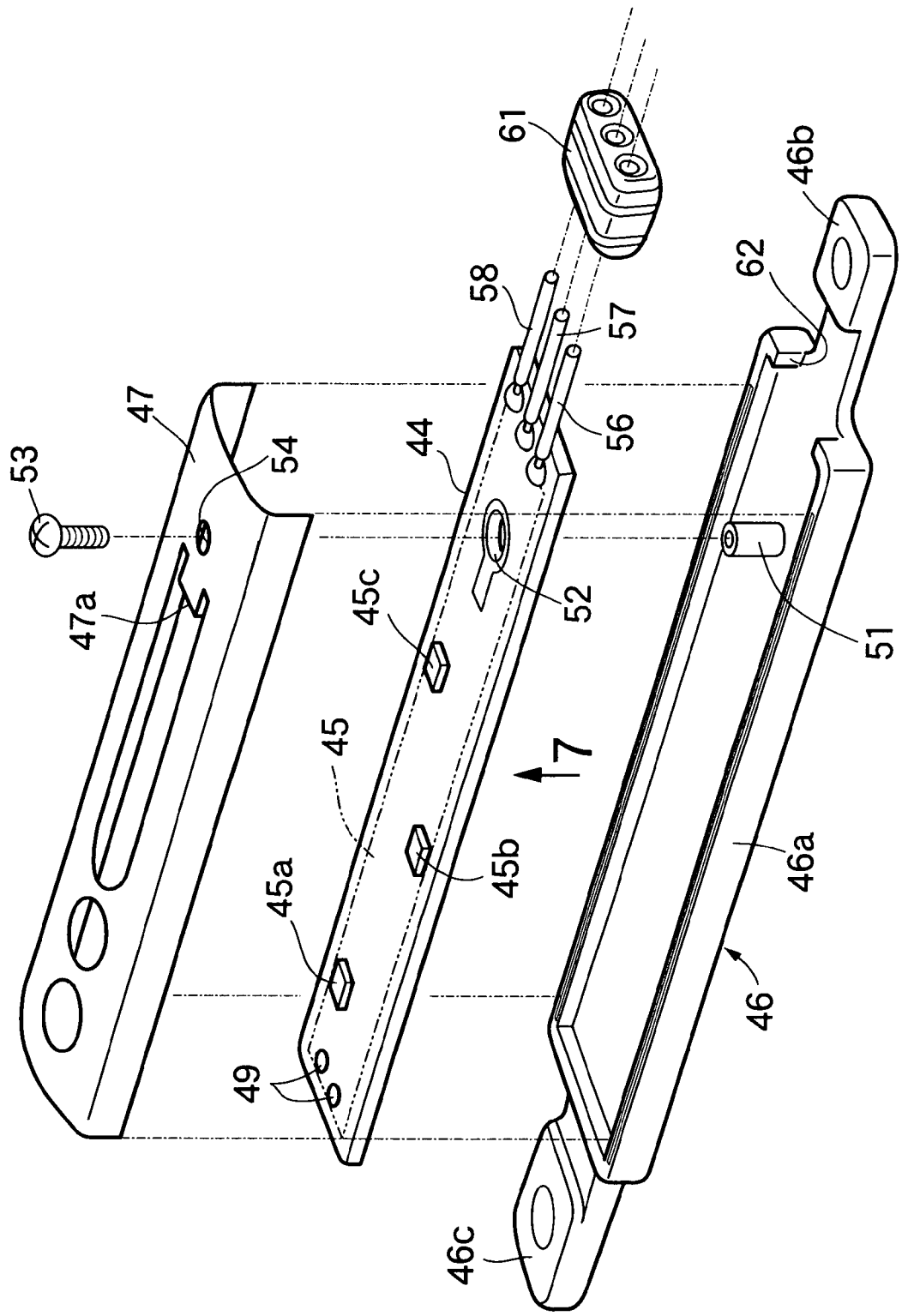
Figure 7:
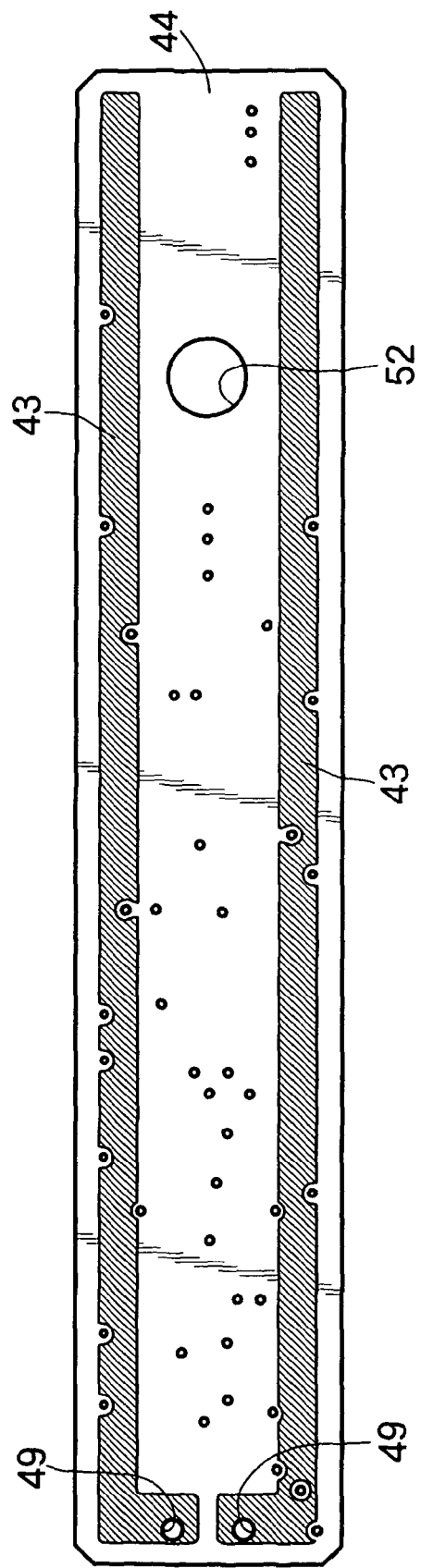

Referring in addition to FIG. 6 and FIG. 7, the sensor unit 42 is formed by covering, with a synthetic resin covering portion 48, a pair of electrodes 43, a circuit board 44 provided with a detection circuit 45 for detecting a change in capacitance between the electrodes 43, a majority of a holder 46 on which the circuit board 44 is mounted, and a ground plate 47 attached to the holder 46 so as to cover the electrodes 43 and the circuit board 44 from the cover 23 side.

The detection circuit 45 is provided on the circuit board 44 by mounting components 45a, 45b, 45c, etc. on one face of the circuit board 44 on the ground plate 47 side, that is, on the side opposite to the vehicle, and the electrodes 43 are patterned on the other face of the circuit board 44 on the side opposite to the side where the components 45a, 45b, 45c, etc. are mounted, that is, on the vehicle side.

The holder 46 is formed from a rigid synthetic resin so as to integrally have a holder main portion 46a, a first arm portion 46b, and a second arm portion 46c, the holder main portion 46a being formed in a rectangular box shape opening on the cover 23 side and being covered by the covering portion 48, the first arm portion 46b protruding forward from a front end part of the holder main portion 46a and projecting from the covering portion 48, and the second arm portion 46c protruding rearward from the rear end of the holder main portion 46a and projecting from the covering portion 48.

The circuit board 44 is disposed so as to cover an open end of the holder main portion 46a, and the face of the circuit board 44 on which the electrodes 43 are disposed is bonded and fixed to a base of the holder main portion 46a by means of double-sided tape (not illustrated). Furthermore, a pair of connection holes 49 for electrically connecting the electrodes 43 to the detection circuit 45 are provided in a rear part of the circuit board 44.

The ground plate 47 is formed in a substantially U-shaped cross section so as to cover the holder main portion 46a of the holder 46 and the circuit board 44 from the cover 23 side. A mounting boss 51 is projectingly provided integrally with the holder main portion 46a of the holder 46 so as to be in contact with the side of the circuit board 44 opposite to the side where the detection circuit 45 is provided. Furthermore, a connecting plate portion 47a abutting against the circuit board 44 in the vicinity of the mounting boss 51 is formed in the ground plate 47 by punching upwardly a part of the ground plate 47, and through holes 52 and 54 are provided in the circuit board 44 and the ground plate 47 in portions corresponding to the mounting boss 51. The circuit board 44 and the ground plate 47 are mounted on the holder 46 by screwing and tightening a screw member 53 passed through the through holes 52 and 54 into the mounting boss 51. Moreover, the connecting plate portion 47a is in contact with the ground pattern on the circuit board 44, and the ground plate 47 is electrically connected to the ground pattern on the circuit board 44 by tightening the screw member 53.

Three conductors 56, 57, and 58 are connected by soldering to the detection circuit 45 of the circuit board 44; these conductors 56 to 58 are taken outside the holder main portion 46a via a lead opening 62 provided in a front part of the holder main portion 46a, and are passed through and retained by a grommet 61 attached to the first arm portion 46b of the holder 46. A harness 59 that collects together the conductors 56 to 58 is led outside via a lead out hole 60 provided in the support arm portion 22b of the handle main body 22.

The first and second arm portions 46b and 46c of the holder 46 project from the covering portion 48; a first mounting seat 63 is provided on the handle main body 22 forward of the housing recess 41, the extremity of the first arm portion 46b abutting against the first mounting seat 63, and a second mounting seat 64 is provided on the handle main body 22 to the rear of the housing recess 41, the extremity of the second arm portion 46c abutting against the second mounting seat 64. The first arm portion 46b is mounted on the first mounting seat 63 by a screw member 65, and the second arm portion 46c is mounted on the second mounting seat 64 by a screw member 66.

Figure 8:
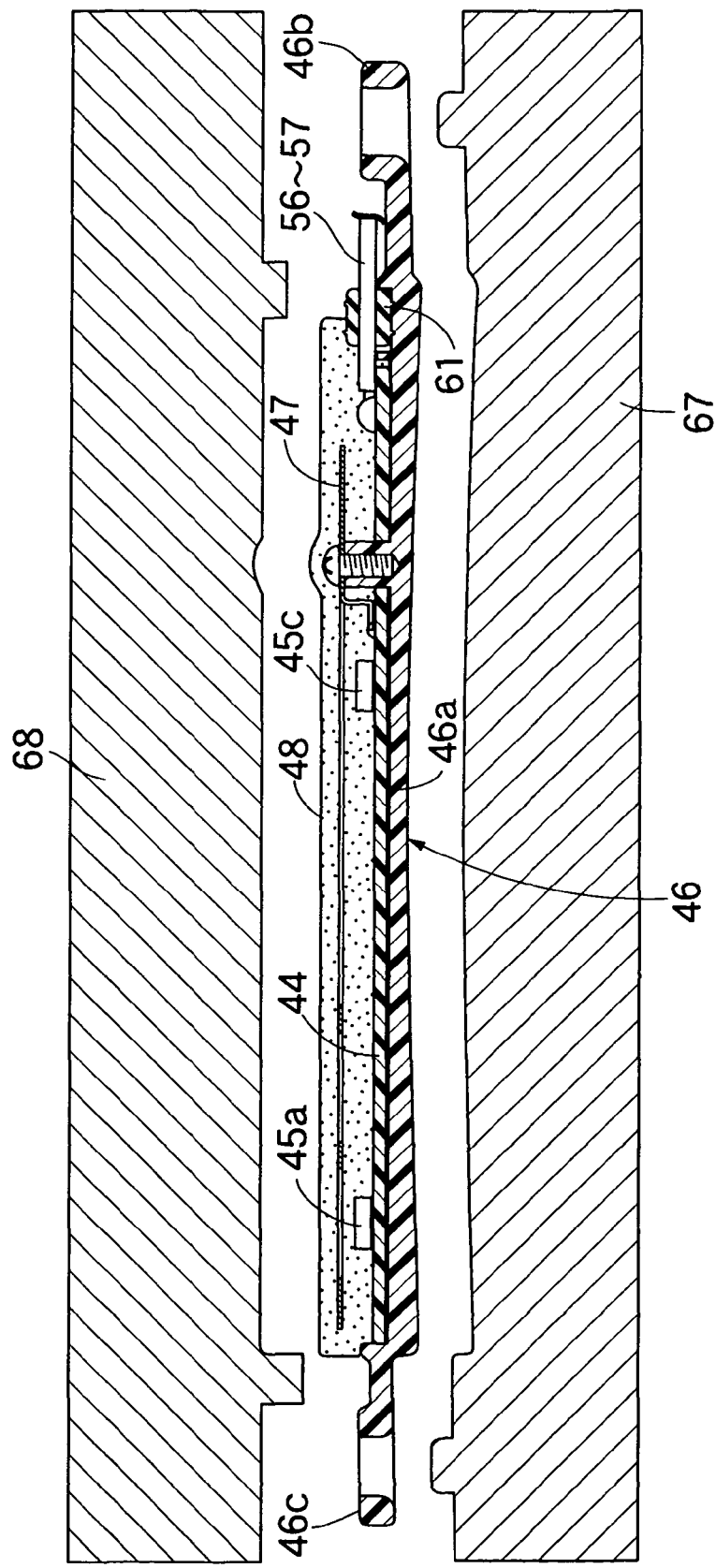

Referring in addition to FIG. 8, the sensor unit 42 is made by forming the covering portion 48 by die-molding between dies 67 and 68 the holder 46, to which are assembled the ground plate 47 and the circuit board 44 having the pair of electrodes 43 patterned thereon and the detection circuit 45 provided thereon, and in which the conductors 56 to 58 connected to the circuit board 44 are inserted through and retained by the grommet 61 attached to the first arm portion 46b; since the first and second arm portions 46b and 46c of the holder 46 project from the covering portion 48, when the covering portion 48 is die-molded by means of the dies 67 and 68 the two arm portions 46b and 46c have the functions of positioning and supporting the holder 46 within the dies 67 and 68.

By die-molding in this way, the covering portion 48 is formed in a shape that can be housed in the housing recess 41 of the handle main body 22; a waterproof seal 69 such as a sponge for preventing water from penetrating between the handle main body 22 and the sensor unit 42 and affecting the capacitance between the electrodes 43 is disposed between the covering portion 48 and the base wall of the housing recess 41 in a state in which the sensor unit 42 is housed in the housing recess 41, and this waterproof seal 69 is bonded to the covering portion 48 by means of, for example, double-sided tape.

The operation of this embodiment is now explained. Since the pair of electrodes 43, the circuit board 44 provided with the detection circuit 45 for detecting a change in capacitance between the electrodes 43, and the ground plate 47 covering the electrodes 43 from the cover 23 side are housed within the operating handle 14, a change in capacitance between the pair of electrodes 43 resulting from the vehicle user touching the operating handle 14 is detected by the detection circuit 45, thus enabling a vehicle user's intention to unlock or lock to be reliably confirmed.

Furthermore, since the sensor unit 42, which includes the pair of electrodes 43, the circuit board 44, and the covering portion 48, which is made of a synthetic resin and covers the electrodes 43 and the circuit board 45, is fixedly housed in the housing recess 41 formed in the handle main body 22 so as to open on the cover 23 side, the circuit board 44 and the pair of electrodes 43 can be easily assembled within the operating handle 14 and the water resistance of the circuit board 44 and the electrodes 43 can be improved.

Moreover, since the electrodes 43 are patterned on the circuit board 44, it is unnecessary to ensure that there is a space for arranging the electrodes 43 separately from the circuit board 44, thereby making the sensor unit 42 and, consequently, the operating handle 14, thin. Furthermore, since the electrodes 43 are patterned on, among opposite faces of the circuit board 44, the face on the vehicle side, it is possible to reliably detect the vehicle user's hand touching the face of the operating handle 14 on the vehicle side when the vehicle user grasps the operating handle 14.

Moreover, since the components 45a, 45b, 45c, etc. of the detection circuit 45 are mounted on, among the opposite faces of the circuit board 44, the face on the side opposite to the face where the electrodes 43 are patterned, it is possible to make the sensor unit 42 thin and make the operating handle 14 yet thinner.

Furthermore, since the circuit board 44 is mounted on the holder 46, a majority of which is covered by the covering portion 48 so as to form a part of the sensor unit 42, when the covering portion 48 is die-molded so as to cover the circuit board 44 it is possible to position and support the circuit board 44 with the holder 46, and thus easily die-mold the covering portion 48.

Furthermore, since the ground plate 47 forming a part of the sensor unit 42 is mounted on the holder 46 so as to cover the electrodes 43 and is covered by the covering portion 48, it is possible to easily incorporate the ground plate 47 in the sensor unit 42, thereby enhancing the ease of assembly of the ground plate 47 to the handle main body 22.

Moreover, since portions of the holder 46 projecting from the covering portion 48, that is, the first and second arm portions 46b and 46c, are mounted on the first and second mounting seats 63 and 64 provided on the handle main body, the holder 46 can be mounted at a predetermined position of the handle main body 22, and it is possible to easily set the positions of the electrodes 43 within the operating handle 14 by mounting the circuit board 44, on which the electrodes 43 are patterned, on the holder 46. It is thereby possible to maintain a constant spacing between the surface of the handle main body 22 and the electrodes 43, and thereby stably detect a change in capacitance.

Although an embodiment of the present invention is explained in detail above, the present invention is not limited to the above-mentioned embodiment and can be modified in a variety of ways without departing from the spirit and scope of the present invention described in the claims.

The invention claimed is:

1. A vehicle door outer handle system comprising:
 an operating handle comprising a handle main body made of a synthetic resin and a cover made of a synthetic resin so as to cover the outer side of the handle main body, the operating handle being disposed on an outer side of a vehicle door;
 a sensor unit positioned within the operating handle, comprising:
 a circuit board formed of a single plate;
 a ground plate covering the circuit board;
 a pair of electrodes patterned on the circuit board;
 a detection circuit provided on the circuit board for detecting a change in capacitance between the electrodes, wherein, among opposite faces of the circuit board, a component of the detection circuit is mounted on the face of the circuit board that is opposite to the face of the circuit board where the electrodes are patterned;
 wherein, the circuit board and the ground plate are mounted on a holder positioned within the operating handle; and
 wherein, a covering portion made of synthetic resin and the holder envelops the ground plate and the circuit board.

2. The vehicle door outer handle system according to claim 1, wherein, among opposite faces of the circuit board, the electrodes are patterned on the face on the vehicle side.

3. The vehicle door outer handle system according to claim 1, wherein the sensor unit is fixedly housed in a housing recess formed in the handle main body so as to open on the cover side.

4. The vehicle door outer handle system according to claim 3, wherein a majority of the holder is covered by the covering portion so as to form a part of the sensor unit.

5. The vehicle door outer handle system according to claim 4, wherein a portion of the holder projecting from the covering portion is mounted on a mounting seat provided on the handle main body.

6. The vehicle door outer handle system according to claim 3, wherein a portion of the holder projects from the covering portion and is mounted on the mounting seat provided on the handle main body.

* * * * *